(12) United States Patent
Parviainen et al.

(10) Patent No.: US 11,444,937 B2
(45) Date of Patent: Sep. 13, 2022

(54) DEPLOYMENT OF A DEVICE

(71) Applicant: KONE Corporation, Helsinki (FI)

(72) Inventors: Olli Parviainen, Helsinki (FI); Jouko Kinnari, Helsinki (FI)

(73) Assignee: KONE CORPORATION, Helsinki (FI)

( * ) Notice: Subject to any disclaimer, the term of this patent is extended or adjusted under 35 U.S.C. 154(b) by 163 days.

(21) Appl. No.: 16/738,647

(22) Filed: Jan. 9, 2020

(65) Prior Publication Data
US 2020/0153812 A1    May 14, 2020

Related U.S. Application Data

(63) Continuation of application No. PCT/FI2017/050573, filed on Aug. 14, 2017.

(51) Int. Cl.
*H04L 9/40* (2022.01)
*H04W 12/06* (2021.01)
*H04W 12/50* (2021.01)

(52) U.S. Cl.
CPC ........ *H04L 63/083* (2013.01); *H04L 63/0884* (2013.01); *H04W 12/06* (2013.01); *H04W 12/50* (2021.01)

(58) Field of Classification Search
CPC . H04L 63/083; H04L 63/0884; H04L 9/3226; H04W 12/50; H04W 12/06; H04W 12/069
See application file for complete search history.

(56) References Cited

U.S. PATENT DOCUMENTS

| 8,677,342 | B1 * | 3/2014 | Kidder | ................ H04L 41/0843 717/171 |
| 2008/0059239 | A1 * | 3/2008 | Gerst | .................... H04W 12/06 707/E17.107 |
| 2010/0045425 | A1 | 2/2010 | Chivallier | |
| 2014/0106673 | A1 * | 4/2014 | Son | ......................... H04L 67/28 455/41.1 |

(Continued)

FOREIGN PATENT DOCUMENTS

EP    1 635 508 A1    3/2006

OTHER PUBLICATIONS

Zhengguo Sheng et al., "Recent Advances in Industrial Wireless Sensor Networks Toward Efficient Management in IoT," Jun. 1, 2015, pp. 622-637. (Year: 2015).*

(Continued)

*Primary Examiner* — Luu T Pham
*Assistant Examiner* — Canh Le
(74) *Attorney, Agent, or Firm* — Birch, Stewart, Kolasch & Birch, LLP

(57) ABSTRACT

A method for deploying a device to a local network hosted by a host device includes receiving a message causing the host device to request a piece of information from the device; requesting a determination if the received piece of information comprises data corresponding to an expected data pattern; if the received piece of information comprises data corresponding to the expected data pattern initiating a pairing with the device; and in response to the pairing generating an indication that the device is paired with the host device. A host device, a system and to a computer program product are also disclosed.

15 Claims, 4 Drawing Sheets

(56) References Cited

U.S. PATENT DOCUMENTS

| | | | |
|---|---|---|---|
| 2014/0223174 A1* | 8/2014 | Krishnamurthy ... | H04L 63/0442 713/158 |
| 2014/0247941 A1* | 9/2014 | Gu .................. | H04W 12/04 380/270 |
| 2015/0150106 A1* | 5/2015 | Lund ................ | H04L 63/08 726/7 |
| 2017/0015521 A1* | 1/2017 | Toutaoui ........... | B66B 5/0025 |
| 2018/0375659 A1* | 12/2018 | Kozma ............. | H04L 63/083 |

OTHER PUBLICATIONS

Bo Han et al., "Network Function Virtualization: Challenges and Opportunities for Innovations," IEEE, 2015, pp. 90-97. (Year: 2015).*

International Search Report (PCT/ISA/210) issued in PCT/FI2017/050573, dated May 2, 2018.

Written Opinion of the International Searching Authority(PCT/ISA/237) issued in PCT/FI2017/050573, dated May 2, 2018.

* cited by examiner

DEPLOYMENT OF A DEVICE

CROSS REFERENCE TO RELATED APPLICATIONS

This application is a Continuation of PCT International Application No. PCT/FI2017/050573, filed on Aug. 14, 2017, which is hereby expressly incorporated by reference into the present application.

TECHNICAL FIELD

The invention concerns in general the technical field of management of devices. More particularly, the invention concerns a deployment of a device.

BACKGROUND

More and more systems are nowadays monitored with different kinds of devices, which may e.g. generate data representing operational information on the system under monitoring. Typically, the devices are first monitored locally by a so called host device, which is further configured to exchange of information with a data center. The data center may be configured to communicate with a plurality of host devices, and in that manner to create a monitoring network. This kind of arrangement is implemented, for example, for monitoring elevators, escalators, but also for monitoring automatic doors as well as building automation related devices among other.

The environment as described creates maintenance related challenges. A first type of challenge relates to authorization issues. More specifically, the challenges arise from preventing unauthorized entities to access the monitoring system e.g. in a context of deployment of one or more devices in the monitoring system. A second type of challenge relates to device authentication i.e. how to safeguard that a device under deployment ends up being in connection to a correct host devices in an environment of a plurality of host devices. A third challenge relates to a location into which the device is installed. The installation point needs to be known and it shall be distinguished from installation points of other devices in many cases. A fourth challenge relates to proving an authenticity of a device coupled to the monitoring system i.e. that the device is such that it is dedicated to the system and not e.g. an unauthorized 3rd party device. Finally, a fifth challenge may relate to preventing unauthorized use of the device e.g. in such a manner that the device may get connected, or coupled, to an unauthorized host device and in that manner use the device for unauthorized purposes.

As may be seen from above there is need to develop solution which may be applied in the context of monitoring systems by means of which at least some of the above described challenges may be mitigated, at least in part.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a device, a system and a computer program product for deploying a new device in a local network. Another objective of the invention is that the method, the device, the system and the computer program product provides a solution for deploying the new device in a secure manner.

The objectives of the invention are reached by a method, a device, a system and a computer program product as defined by the respective independent claims.

According to a first aspect, a method for deploying a device to a local network hosted by a host device is provided, the method comprises: receiving, in the host device, a message causing the host device to request a piece of information from the device under deployment; in response to a receipt of the requested piece of information from the device under deployment requesting a determination if the received piece of information comprises data corresponding to an expected data pattern; in response to an outcome of the determination that the received piece of information comprises data corresponding to the expected data pattern initiating a pairing with the device under deployment to the local network; and in response to the pairing generating an indication that the device is paired with the host device.

The message causing the host device to request the piece of information from the device under deployment may be received from one of the following: a control device, a data center, a data center through a control device. The transmit of the message from the data center may be triggered by the control device.

Further, the request of the determination if the received piece of information comprises data corresponding to the expected data pattern may be performed internally in the host device.

The request of the determination if the received piece of information comprises data corresponding to the expected data pattern may be transmitted, from the host device, to at least one of the following: the control device, the data center.

The request of the piece of information and the determination if the received piece of information comprises data corresponding to an expected data pattern may be implemented with challenge-response authentication.

The generated indication on the pairing may be transmitted to at least one of the following: the control device, the data center.

Still further, the method may further comprise: identifying a user of the control device through a user authentication performed by the control device prior to a communication of the control device causing the host device to request a piece of information from the device under deployment.

According to a second aspect, a host device for deploying a device to a local network hosted by the host device is provided, the host device comprising: at least one processor; at least one memory including computer program code; the at least one memory and the computer program code configured to, with the at least one processor, cause the host device to perform: receive a message causing the host device to request a piece of information from the device under deployment; request, in response to a receipt of the requested piece of information from the device under deployment, a determination if the received piece of information comprises data corresponding to an expected data pattern; initiate, in response to an outcome of the determination that the received piece of information comprises data corresponding to the expected data pattern, a pairing with the device under deployment to the local network; and generate, in response to the pairing, an indication that the device is paired with the host device.

The host device may be configured to receive the message causing the host device to request the piece of information from the device under deployment from one of the following: a control device, a data center, a data center through a control device.

The host device may be configured to perform the request of the determination if the received piece of information comprises data corresponding to the expected data pattern internally in the host device.

The host device may be configured to request the determination if the received piece of information comprises data corresponding to the expected data pattern from at least one of the following: the control device, the data center.

Further, the host device may be configured to implement the request of the piece of information and the determination if the received piece of information comprises data corresponding to an expected data pattern with challenge-response authentication.

The host device may be configured to transmit the generated indication on the pairing to at least one of the following: the control device, the data center.

According to a third aspect, a system for deploying a device to a local network hosted by the host device is provided, the system comprising: the host device, the device under deployment, and a control device, wherein the system: the control device is configured to generate a signal causing the host device to request a piece of information from the device under deployment; and in response to a receipt of the requested piece of information from the device under deployment the host device is configured to request a determination if the received piece of information comprises data corresponding to an expected data pattern; and in response to an outcome of the determination that the received piece of information comprises data corresponding to the expected data pattern the host device is configured to initiate a pairing with the device under deployment to the local network; and in response to the pairing the host device is configured to generate an indication that the device is paired with the host device.

The control device may be configured to, for causing the host device to request the piece of information from the device under deployment, generate the signal to at least one of the following: the host device, a data center belonging to the system.

The host device may also be configured to request the determination if the received piece of information comprises data corresponding to the expected data pattern from one of the following: the host device internally, the control device, the data center.

The host device may be configured to generate the request to an entity that generated the signal causing the host device to request a piece of information from the device.

The control device may be configured to identify a user of the control device through a user authentication prior to a communication causing the host device to request a piece of information from the device under deployment.

According to a fourth aspect, a computer program product is provided, the computer program product comprising at least one computer-readable storage medium having computer-executable program code instructions stored therein for performing the method as described above when the computer program product is executed on a computing unit, such as on a host device.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of an environment in which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
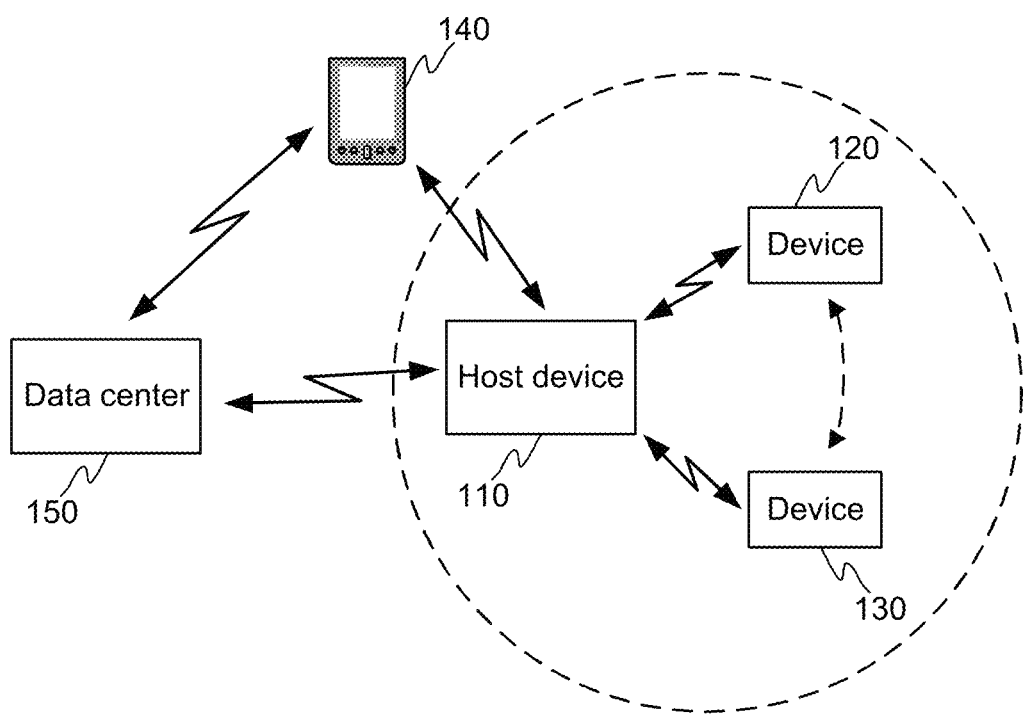

FIG. 1 schematically illustrates an example of an environment in which the present invention may be implemented to. A local network is implemented to a certain location with a host device 110 and one or more devices 120, 130. The devices 120, 130 may be communicatively coupled to the host device 110 and the devices 120, 130 may also be configured to directly communicate with each other. The local network may e.g. be established so that the communication technology between the mentioned entities is an applicable wireless communication technique or the devices may be communicatively coupled to each other in a wired manner. The devices 120, 130 may e.g. be sensor devices configured to generate measurement data of a predetermined characteristic typical to the environment under monitoring. For example, the sensor devices may be wireless door sensors installed to elevator doors in order to monitor the operation of the elevator doors. The host device 110, in turn, may e.g. be a locally installed master device, which is communicatively coupled to the devices 120, 130, but possibly also to a data center 150. Hence, the host device 110 may be configured to execute a plurality of communication protocols, e.g. some short range wireless communication protocol, such as Bluetooth, for the devices 120, 130 and a wide range communication protocol, such as 3G or 4G, for communicating with the data center 150 over a mobile communication network, for instance. The host device 110 may also be configured to store at least temporarily the measurement data and even to perform predetermined operations to the measurement data, as well as to generate control operations e.g. locally with respect to a device or a system monitored with the devices 120, 130. The host device 110 may also be configured to communicate with a further device called as a control device 140 in the context of the present invention. The control device 140 may also be configured to communicate directly with the data center 150. Again, the communication protocols may e.g. be the same as the ones mentioned above. In the following at least some aspects of the present invention is described and the operation of the mentioned entities is described in more detail when implementing the invention in the environment shown in FIG. 1.

In the following it is assumed that a new device, referred with 120 from now on, is to be deployed in the local network hosted by a host device 110. The new device 120 may replace another device, e.g. a device got broken, or it may be a totally new device to be deployed in the local network. At least some aspects of the invention relating to the deployment of the device 120 are described by referring to FIG. 2, which schematically illustrates an example of a method for deploying the device 120 to a local network especially from a perspective of the host device 110.

First, a person, such as a technician, may arrive in a location where the device 120 is to be installed. For example, the location may be a building equipped with an elevator and the technician installs the device 120, such as an elevator door sensor, in place and the device 120 may be deployed to the local network in an exemplified manner described herein. For deploying the device 120 the technician may use a control device 140 at least configured to perform operations by means of which the device 120 may be deployed to operate in the local network established with at least one host device 110 and the device 120.

Now, a local network management application installed in the control device 140 may be initiated. The initiation may be achieved with some predetermined operation performed by the technician, such as selecting the application with a predetermined gesture performed with a touch screen of the control device 140, or any similar operation causing the initiation of the local network management application in the control device 140. Alternative, the initiation of the application may be automatic and triggered according to a predetermined rule defined in the application, or in the control device 140. For example, a triggering rule may e.g. be based on a determination of a location of the control device 140 or on a signal receipt in the control device 140 from an external entity, such as from the device 120. For example, the device 120 may be configured to transmit an initiation signal, or broadcast signal, which may be detected with the control device 140 and which detection causes an initiation of the local network management application in the control device 140.

According to some embodiment of the invention the initiation of the local network management application may comprise an identification of a user, i.e. the technician, intending to access to the local network management application with the control device 140. The identification of the user may e.g. be based on a user authentication with user credentials prompted from the user with the application. In some embodiment a legitimacy of the user credentials received from the user through the user interface may be confirmed locally so that the application may compare the received user credentials to stored data in a memory of the control device and if a match is found, the application may determine that the user may access the application. Alternatively, the application may be configured to transmit the received user credentials, e.g. in an encoded form in a predetermined message, to the data center 150 and inquire a confirmation on the legitimacy of the received user credentials from there. The data center 150 may e.g. return a piece of information indicating if the received user credentials are legitimate or not. An example of the user credentials may be a personal identification number (PIN) input by the user in response to the prompting. The identification may also be based on another type of authentication, such as based on biometrics. The authentication of the user may also be based on so called single-sign on framework, wherein the user has signed with a user account to the control device 140 and the same account may be utilized in accessing the local network management application, i.e. the application itself does not request access credentials from the user.

Moreover, at some stage of the deployment procedure as is now described information on the technician performing the deployment of the new device in the local network may be stored in data storage, residing e.g. in a data center 150. The stored information may e.g. be the user identifier used for accessing the local network management application. Additionally, an identifier on the deployment task with any other information, such as date, may be stored. In this manner a quality aspects on the deployment, and even on a certain technician, may be monitored in response to a receipt of information on the operation of the new device and the local network in general after the deployment of the new device.

Next, the local network management application executed in the control device 140 may be configured to, either automatically or in response to a predetermined manual action, cause a generation of an instruction message to a host device 110 in order to proceed with the deployment of the device 120 to the local network hosted by the host device 110. The generation of the instruction message may be performed by the control device 140 i.e. the control device 140 generates the instruction message and transmits it to the host device 110. Alternatively, the generation of the instruction message may be initiated by the control device 140 so that the control device 140 may be configured to generate and transmit a trigger signal to a data center 150 wherein the trigger signal causes the data center 150 to generate the instruction signal to the host device 110. The trigger signal may e.g. carry information on the host device 110 or the device 120 under deployment and the data center 150 may be configured to obtain necessary pieces of information, such as a network address of the host device 110 from data storage accessible by it, and generate an transmit the instruction message to the host device 110.

In some embodiment the control device 140 may be configured to, prior to a generation of the instruction message or the trigger message, initiate a connection establishment between the control device 140 and the host device 110 hosting the local network into which the device 120 is to be deployed. The connection establishment may comprise, but is not limited to, switching on a communication mode in the control device 140 by means of which the connection may be established e.g. automatically with a certain, such as predetermined, host device 110 if they reside within operational vicinity to each other with the communication technology in use.

Alternatively or in addition, the connection establishment may comprise a search of host devices 110 residing in an operational vicinity of the communication technology by means of which the searching of host devices 110 is performed, and when one or more host devices 110 are found the control device 140 may be configured to pair with an applicable host device 110. The applicable host device may e.g. be selected based on a name of the host device 110 obtained during the search. According to an embodiment the name of the host device 110 which is to be selected may be pre-stored in the memory of the control device 140 used by the technician for deploying the device 120 in the local network. Alternatively, the control device 140 may be configured to provide the names, or any other identifier, of the host devices 110 found in the search to the data center 150, which may perform an operation for determining which host device 110 corresponds to the one with whom the device 120 is to be deployed. Such determination may be performed by obtaining information from data table which comprises the linkage between the mentioned entities and which data table may be established when the need to deploy the device 110 into a certain local network is found out. Further, the control device 140 may be configured to transmit an identifier of the host device 110 found during the search in the trigger signal mentioned above in order to provide the data center 150 necessary information in order to generate the instruction message to the host device 110 from the data center 150.

In response to a selection of the correct host device 110 the connection may be established between the control device 140 and the host device 110. The establishment may require some predetermined actions from user side, such as confirming the host device 110 as a communicating party, for example, but also exchanging of information by the communicating devices, e.g. through so called handshaking procedure, in order to establish the connection. The embodiment described so far is based on an implementation in which the connection is established directly between the host device 110 and the control device 140. In some other embodiment the connection may be established through the data center 150 i.e. so that the communication is arranged from the data center 150 to the host device 110. For sake of clarity the establishment of connection may refer to a connection which is active either continuously or only temporarily.

In response to the connection establishment between the control device 140 and the host device 110 the local network management application may be configured to generate an instruction message to the host device 110 over the established connection, which is received by the host device 110. Alternatively, the instruction message may be received 210 from the data center 150 as described. In case the instruction message is received from the control device 140 a short range communication channel may be used, for example. On the other hand, if the instruction message is received from the data center a wide range communication channel, e.g. established over mobile communication network. The instruction message may advantageously be formulated so that it causes the host device 110 to request a piece of information from the device 120 to be deployed to the local network with a challenge message. In other words, the host device 110 may either receive a challenge in the instruction message, or caused to generate a challenge in response to a receipt of the instruction message. Thus, the host device 110 may be configured to generate a request to the device 120 wherein a piece of information is requested 220 from the device 120 under deployment. This may refer to an implementation I which a response to the challenge is requested. A receipt of the request in the device 120 under deployment causes the device 120 to generate a response and transmit the response to the host device 110. The host device 110 receives the requested piece of information 230.

Figure 2:
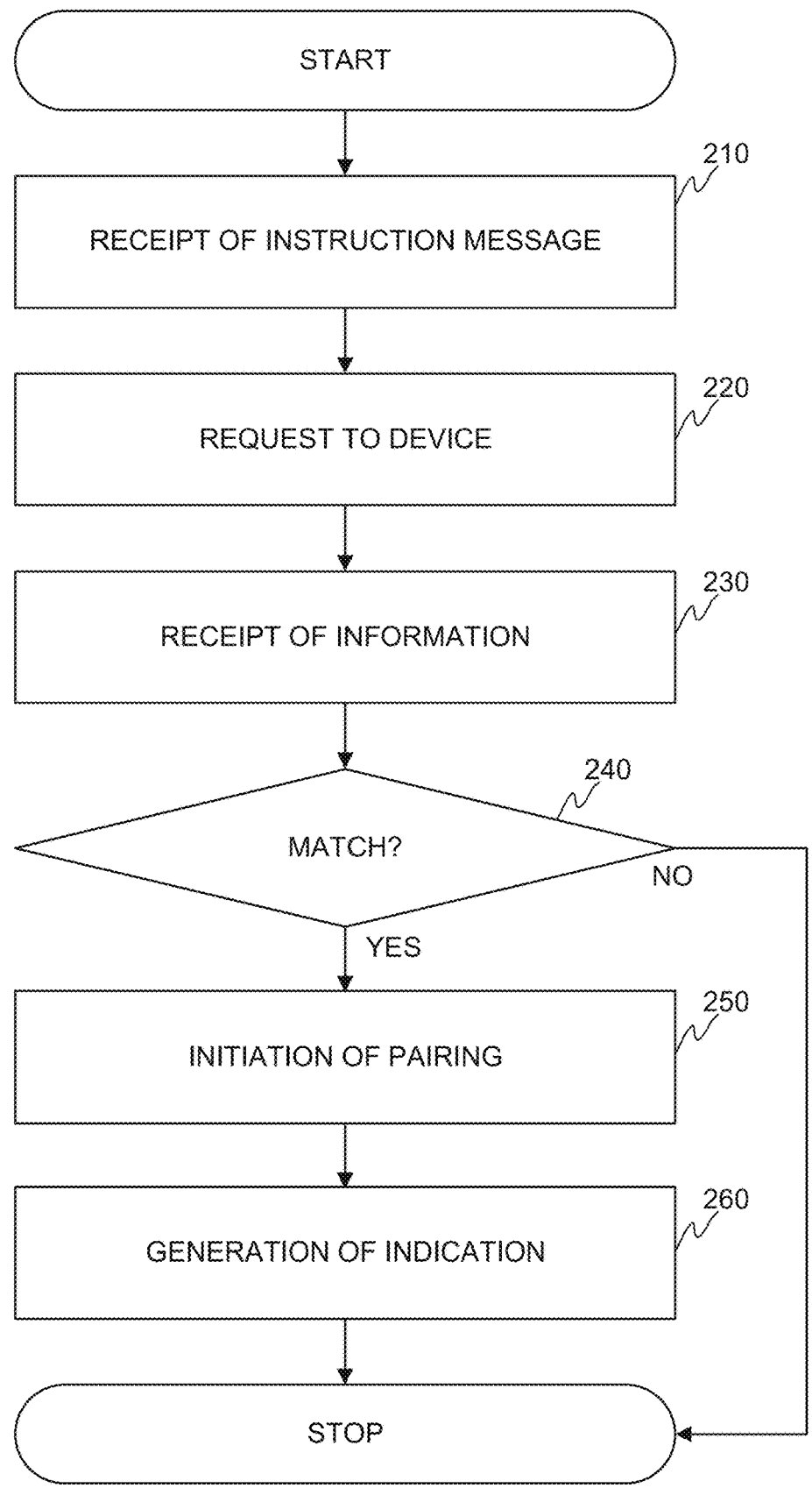
FIG. 2 illustrates schematically an example of a method according to an embodiment of the invention.

Next, as shown in step 240 in FIG. 2 the host device 110 may be configured to request a determination if the received piece of information, such as the response to the challenge, matches with the expected data pattern. In other words, in case of the challenge the entity which generated the challenge is aware of the data pattern which shall be received in response to the challenge i.e. the expected data pattern. The request of the determination may be performed internally by the host device 110 if the host device 110 is in possession of the expected data pattern e.g. if the host device 110 generated the challenge. Alternatively, if the challenge is received from some other entity, such as from the control device 140 or directly from the data center 150 or indirectly from the data center 150 the determination if the received piece of information is correct may be inquired from the entity in question. This may be achieved by transmitting the received piece of information to the entity in question, i.e. to the control device 140 or to the data center 150 over the established communication channel for the determination. The entity being responsible for the determination is advantageously configured to return an indication if the received information from the device 120 is correct or not. In response to the determination that the received piece of information is not correct the host device 110 may be configured to cancel the deployment process of the device 120 in the local network. In some embodiment it may also generate a message to the control device 140 for indicating it. On the other hand, if the determination indicates that the received piece of information is correct, the host device 110 may be configured to initiate a pairing 250 with the device 120 under deployment to the local network. The initiation of pairing may refer to a procedure allowing the pairing e.g. over a short range communication channel, such as over a Bluetooth, so that the devices are achieved to communicate in the local network. Finally, in response to the pairing of the device 120 in the local network, the host device 110 may be configured to generate an indication 260 that the device 120 is paired with the host device 110. The indication may e.g. be transmitted to the control device 140 and/or to the data center 150. Summarizing above the request in step 220 and the receipt of information and the determination of it (step 240) may be considered to establish a challenge-response authentication mechanism applicable at least in some embodiment of the present invention.

The description above discloses at least some aspects of the invention in a situation in which the new device is to be installed into the local network in a straightforward manner. However, in some situations there may be a need to define accurately that the new device is deployed in a correct manner and that it is configured to operate as planned. For example, there may be a need to identify which new device is installed on which installation point. This may e.g. be the case if a plurality of new devices are to be deployed at the same time, or the importance on the installation point is important e.g. in a sense of receiving accurate measurement results if the device is configured to perform measurement function. This may be taken into account in several manners. The application used for the deployment may store installation instructions and it may be configured to provide the technician exact instructions where the new device shall be installed to. The technician may be requested to acknowledge the installation step-by-step, for example. Alternatively or in addition, the position of the device may be configured determined e.g. by using some known positioning system, such as indoor positioning, and the obtained position information may be confirmed by some entity, such as the control device or the data center. Moreover, it may be arranged that when the installation and deployment is done some test procedure, e.g. locally between the new device, the host device and the control device is performed, and the control device determines, based on the input from the test procedure if the new device is correctly positioned and operates in a desired manner. These mechanisms are non-limiting examples.

In FIGS. 3A-3D it is schematically illustrated some examples of the described implementations relating to the pairing in response to the receipt of the instruction message.

Figure 3A:
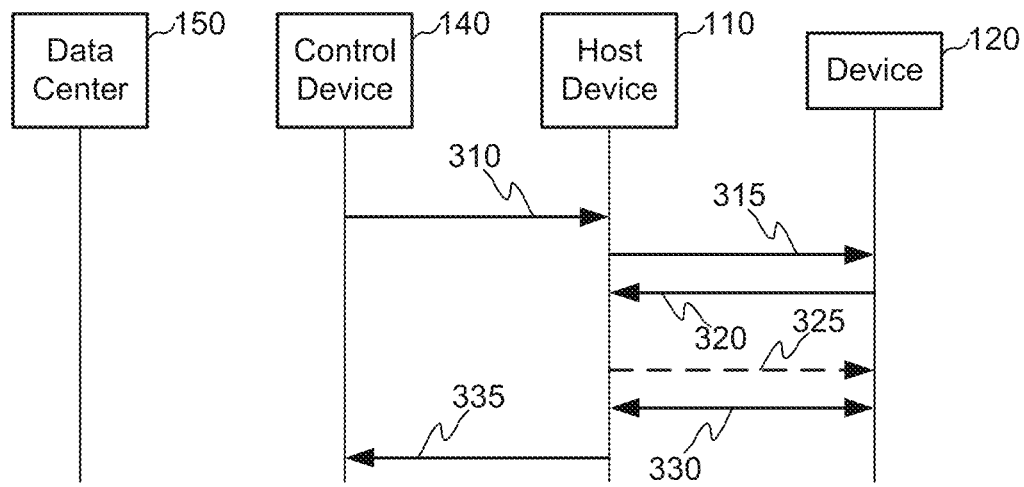
FIGS. 3A-3D illustrate schematically examples of signaling according to some embodiments of the invention.

FIG. 3A schematically illustrates an embodiment in which the control device 140 may generate the instruction message 310 comprising a predetermined command causing the host device 110 to generate so called challenge message 315 to the device 120 into which the device 120 shall respond with a response message 320 comprising a piece of information pre-stored e.g. in a memory of the device 120 or determined by the device 120 at least in part by means of the data transmitted in the challenge message, e.g. in a form of data pattern and obtained in response to the receipt of the challenge message 315. The host device 110 may confirm that the piece of information in the response corresponds to an expected data pattern, and if that is the case the host device 110 may allow a pairing of the device 120 with it. The host device 110 may indicate this to the device 120 (arrow referred with 325). As a result the device 120 may be deployed in the local network and the communication 330 between the entities may start. Moreover, the host device 110 may be configured to indicate 335 any or all of the mentioned events, such as the successful challenge-response procedure or the successful pairing, to the control device 140.

Figure 3B:
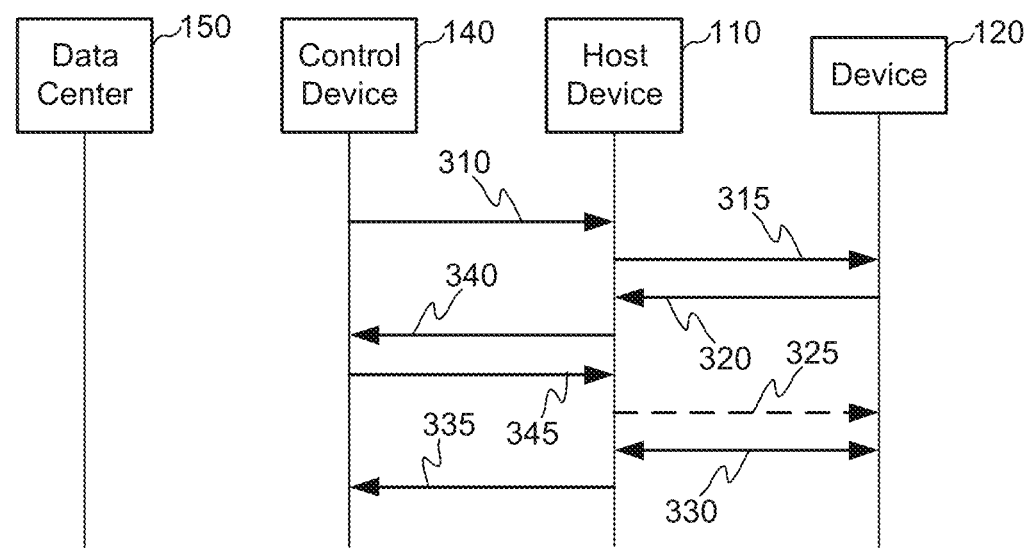

FIG. 3B, in turn, schematically illustrates an embodiment in which the control device 140 is configured to perform a confirmation for the challenge-response procedure. Herein, the signals 310, 315 and 320 correspond to the ones of FIG. 3A, but in signal 310 a challenge generated by the control device 140 may be carried to the host device 110. However, in response to a receipt of the predetermined piece of information from the device 120 the host device 110 may be configured to transmit the piece of data, such as the data pattern, to the control device 140 for confirming its legitimacy (arrow referred with 340 in FIG. 3B). The control device 140 may be configured to perform the confirmation by obtaining a comparison value, i.e. expected data pattern, and by comparing the received piece of data to the comparison value and if they meet each other, the confirmation may be generated. The outcome of the confirmation may be communicated to the host device 110 in message 345. The signals, or messages, 325, 330 and 335 in FIG. 3B correspond to the ones shown in FIG. 3A.

Figure 3C:
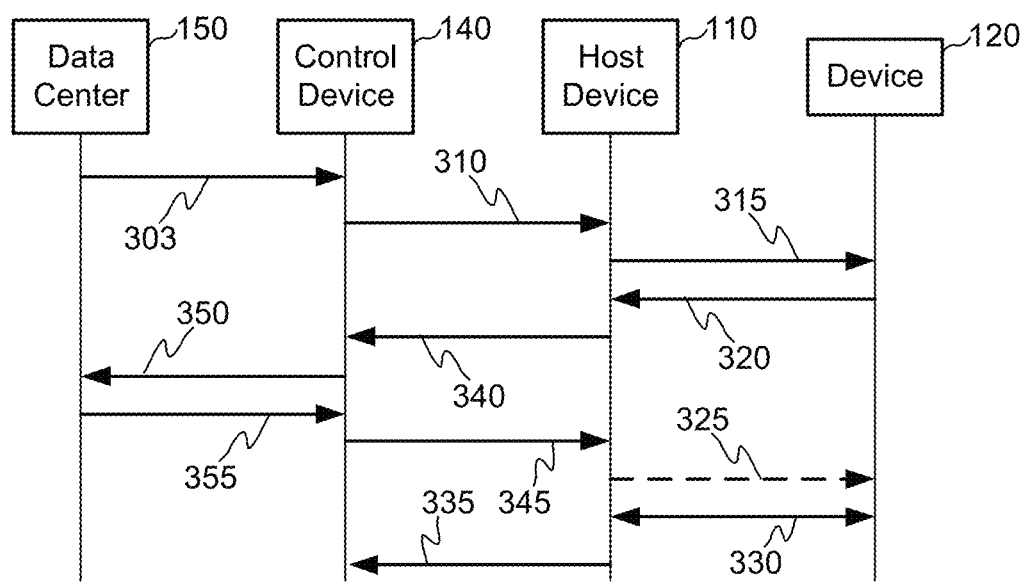

Furthermore, in FIG. 3C it is schematically illustrated an embodiment in which the data center 150 is configured to perform a confirmation for the challenge-response procedure. For example, the data center 150 may have generated the challenge and deliver an instruction message 303 to the control device 140 for instructing the control device 140 to deliver the challenge to the device 120 through the host device 110. The generation of the challenge and the delivery of it may be triggered by the control device 140 in some embodiment (the signal not shown in FIG. 3C). The signals 303, 310, 315 carry the challenge and the device 120 returns the response in signal 320. The host device 110 may be configured to forward the response to the control device in signal 340, which in turn may be configured to transmit it to the data center 150 (signal 350). The data center 150 may be configured to determine it's a legitimacy of the piece of information in the response. For example, the data center 150 may be configured to perform the determination, i.e. confirmation, by obtaining a comparison value, i.e. the expected data pattern, and by comparing the received piece of data to the comparison value and if they meet each other, the confirmation may be generated. The outcome of the confirmation may be communicated to the control device 140 in a message 355, which may generate the confirmation to the host device in message 345. Again, the signals, or messages, 325, 330 and 335 in FIG. 3C may correspond to the ones shown in the previous embodiments.

Figure 3D:
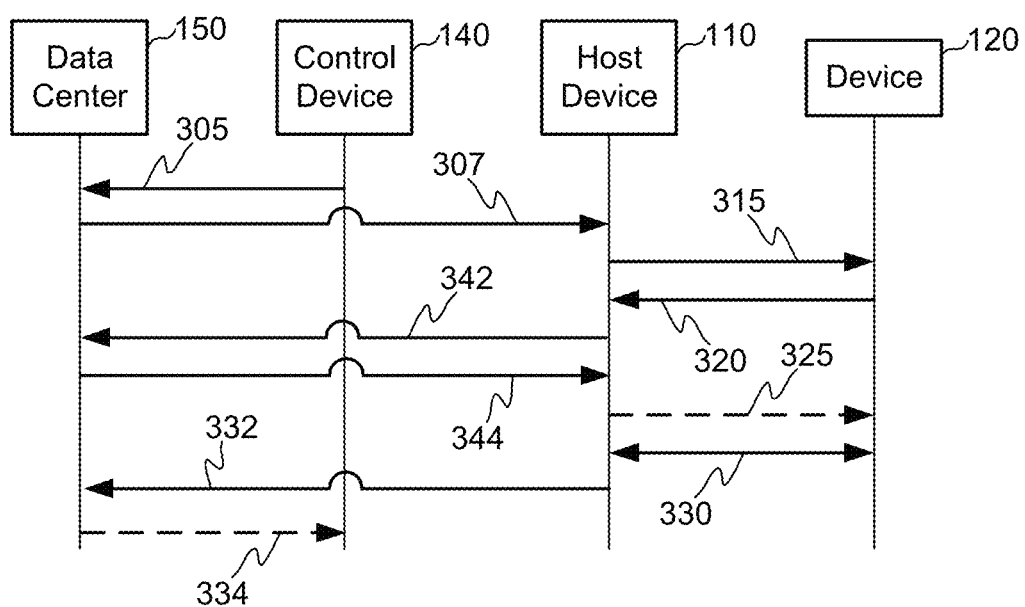

Moreover, FIG. 3D schematically illustrates an embodiment in which the host device 110 is configured to communicate with the data center 150. In the embodiment the control device 140 may trigger the deployment by transmitting a trigger signal 305 to data center 150 e.g. for indicating that the device 120 in ready for deployment. The data center 150 may be configured to generate an instruction message 307 carrying so called challenge, which is to be transmitted by the host device 110 to the device 120 (cf. message 315 in FIG. 3D). Alternatively, the data center 150 may be configured to generate the instruction message 307 to the host device 110, the instruction message comprising a predetermined command causing the host device 110 to generate the challenge and transmit it in a message 315 to the device 120. The device 120 shall respond with a response message 320 formed e.g. based on one-time time data combined with a predetermined piece of information pre-stored e.g. in a memory of the device 120, e.g. in a form of data pattern, and obtained therefrom in response to the receipt of the message 315 comprising the challenge. In response to a receipt of the predetermined piece of data information from the device 120 the host device 110 may be configured to transmit the piece of data, such as the data pattern, to the data center 150 for confirming its legitimacy (arrow referred with 342 in FIG. 3D). The data center 150 may be configured to perform the confirmation by verifying that the received piece of data, for instance, matches with expected characteristics, in which case the confirmation may be generated. The outcome of the confirmation may be communicated to the host device 110 in message 344. On the other hand, if the host device 110 is instructed to generate the challenge by the data center 150, as described above, the host device 110 may perform the confirmation in the same manner as described above, and indicate this to data center 150 e.g. in the message 342. The data center 150 may confirm, or acknowledge, it with message 344. In response to the receipt of the confirmation 344 the host device 110 and the device may communicate with signals, or messages, 325, 330 as described earlier. Moreover the host device 110 may be configured to indicate 335 any or all of the mentioned events, such as the device 120 is deployed in the local network, to the data center 150 with signal 332. The data center 150 may be configured, at least in some embodiment, to acknowledge the deployment to the control device 140 as indicated with arrow 334 in FIG. 3D. In the manner as schematically illustrated in FIGS. 3A-3D it is possible to improve safety of the system in a sense that each new device to be deployed in the local network is authenticated before pairing them to the local network.

As already mentioned, an outcome of the procedure shown e.g. in FIG. 2 may be that the host device 110 receives, in response to the determination, that the device 120 may be paired with the host device 110 and in response to a successful pairing the communication 330 between the host device 110 and the device 120 deployed to the local network may be performed. Moreover, when the pairing is completed the host device 110 may be configured to provide any other information, such as the information received in the instruction message or in any latter message relating e.g. to configuration settings defined for the device 120 in question, and instruct the device 120 to take the configurations into use, i.e. installing the settings in the device 120. Alternatively, the host device 110 may be configured to transmit an indication on the successful pairing to the control device 140 and possibly even to inquire information relating to a configuration of the device 120. The control device 140 may obtain the information from memory, request it from the data center 150 or from the user of the control device 140. Upon a receipt of configuration related information of the device 120 the information may be provided to the host device 110 from the control device 140, which may e.g. cause a configuration of the device, or initiation of a setup of the local network. Moreover, the control device 140 may be configured to transmit the configuration information provided to the local network to the data center 150 in order to maintain up-to-date information in the data center as regards to the configuration of the local network and any device in the local network. The same may be performed either directly or indirectly with the data center 150 if the communication channel is available from the host device 110 to the data center 150, and the system is arranged to operate accordingly.

Figure 4:
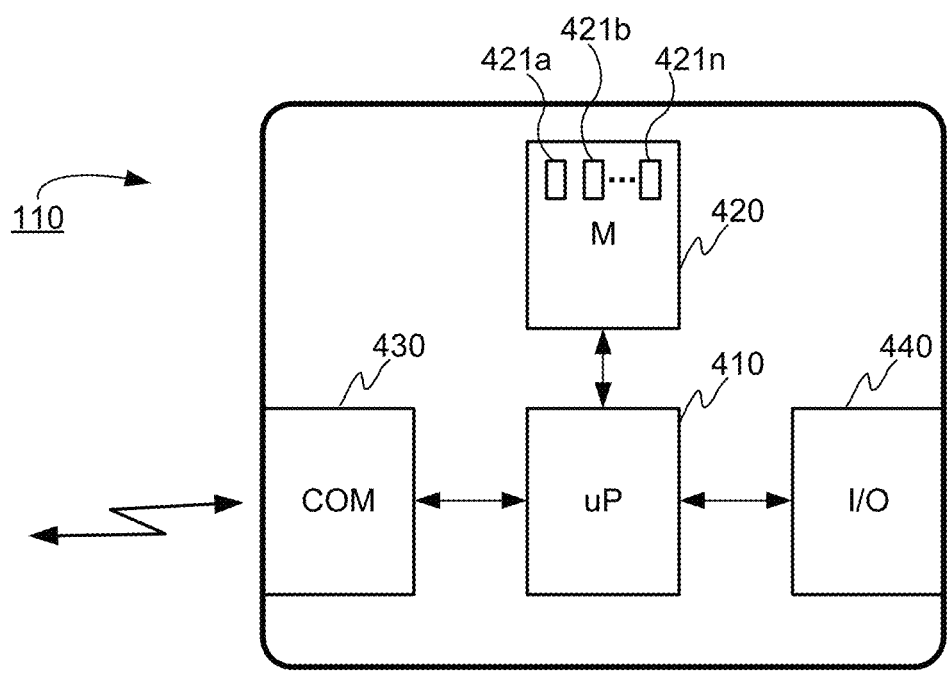
FIG. 4 illustrates schematically a host device according to an embodiment of the invention.

Some aspects of the present invention relates to a host device 110 configured to perform, i.e. execute, at least some steps of the method. FIG. 4 schematically illustrates at least some aspects of the host device 110. The execution of the method may be achieved by arranging the processor 410 to execute at least some portion of computer program code 421a-421n stored in a memory 420 causing the processor 410, and, thus, the host device 110, to implement one or more method steps as described. Hence, the processor 410 may be arranged to access the memory 420 and to retrieve and to store any information therefrom and thereto. Moreover, the processor 410 may be configured to control the communication through the communication interface 430 with any external unit, such as with at least one of the following: one or more control devices 140 and/or one or more data centers 150 as well as with one or more devices 120, 130. Hence, the communication interface 430 may be arranged to implement, possibly under control of the processor 410, a corresponding communication protocol with an external entity in question. Further, the host device 110 may comprise one or more input/output devices 440 for inputting and outputting information. Such input/output devices may e.g. be keyboard, buttons, touch screen, display, loudspeaker and so on. In some implementation of the host device 110 at least some of the input/output devices may be external to the host device 110 and coupled to it either wirelessly or in a wired manner. For sake of clarity, the processor herein refers to any unit or a plurality of units suitable for processing information and control the operation of the host device 110 and the system in general at least in part, among other tasks. The mentioned operations may e.g. be implemented with a microcontroller solution with embedded software. Similarly, the invention is not limited to a certain type of memory only, but any memory unit or a plurality of memory units type suitable for storing the described pieces of information, such as portions of computer program code and/or parameters usable in the context of the present method, may be applied in the context of the present invention.

Further, some aspects of the present invention may relate to a computer program code by means of which the host device 110, when the computer program code is executed in the host device 110, is caused to control the deployment of the device 120 at least in part as described. The computer program code may comprise, as mentioned, portions of computer program code executable by the processor 410.

As shown in FIG. 1 some aspects of the present invention relate to a system comprising a host device 110, a device 120 to be deployed in the local network, a control device 140 and in some embodiments also a data center 150. The host device 110 may be configured to control the deployment of the device 120 in the local network at least in part as described.

The present invention, as described above, may be applied in elevators and escalators, but also for monitoring automatic doors as well as building automation related devices among other. The local network management application may advantageously prompt the user, such as a technician, to control the deployment of the device 120 in the local network, or it may automatically perform at least some method steps, as described. Moreover, the local network management application may enable configuring the network settings as well as receive input from the user e.g. relating to the deployment process, which information may be stored in the control device 140, but also transmitted to the data center 150 for further use.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for deploying a device to a local network hosted by a host device, the method comprising:
    performing, by a control device, a search to find the host device residing in an operational vicinity of the control device among a plurality of host devices,
    transmitting, by the control device, an identifier of the host device to a data center, to cause the data center to determine whether the host device corresponds to the device under deployment,
    receiving, in the host device, a message from the data center causing the host device to request a piece of information from the device under deployment;
    in response to a receipt of the requested piece of information from the device under deployment, requesting a determination if the received piece of information comprises data corresponding to an expected data pattern;
    in response to an outcome of the determination that the received piece of information comprises data corresponding to the expected data pattern, initiating a pairing with the device under deployment to the local network;
    in response to the pairing, generating an indication that the device is paired with the host device; and
    controlling the paired device via the host device,
    wherein the device is configured to monitor operation of an elevator door, an escalator or an automatic door and to generate measurement data,
    wherein the host device is configured to:
        store the measurement data; and
        perform predetermined operations based on the measurement data, and
    wherein the request of the piece of information and the determination if the received piece of information comprises data corresponding to the expected data pattern is implemented with challenge-response authentication.

2. The method of claim 1, wherein the message causing the host device to request the piece of information from the device under deployment is transmitted from one of the following: a control device, a data center, a data center through a control device.

3. The method of claim 2, wherein the transmission of the message from the data center is triggered by the control device.

4. The method of claim 1, wherein the request of the determination if the received piece of information comprises data corresponding to the expected data pattern is performed internally in the host device.

5. The method of claim 1, wherein the request of the determination if the received piece of information comprises data corresponding to the expected data pattern is transmitted, from the host device, to at least one of the following: the control device, the data center.

6. The method of claim 1, wherein the generated indication on the pairing is transmitted to at least one of the following: the control device, the data center.

7. The method of claim 1, the method further comprising:
identifying a user of the control device through a user authentication performed by the control device prior to a communication of the control device causing the host device to request a piece of information from the device under deployment.

8. The method of claim 1, further comprising:
before performing the search, determining that an existing device connected to the host device needs replacing; and
replacing the existing device with the device under deployment.

9. The method of claim 1, wherein the host device is further configured to generate control operations locally with respect to the device.

10. A system for deploying a device to a local network hosted by a host device, the system comprising:
a data center;
the host device including a processor, wherein the host device is a master device configured to control the device under deployment;
the device under deployment; and
a control device including a screen,
wherein the control device is configured to:
perform a search to find the host device residing in an operational vicinity of the control device among a plurality of host devices,
transmit an identifier of the host device to the data center, to cause the data center to determine whether the host device corresponds to the device under deployment, and
generate a signal to cause the host device to request a piece of information from the device under deployment,
wherein in response to a receipt of the requested piece of information from the device under deployment, the host device is configured to request a determination if the received piece of information comprises data corresponding to an expected data pattern,
wherein in response to an outcome of the determination that the received piece of information comprises data corresponding to the expected data pattern, the host device is configured to initiate a pairing with the device under deployment to the local network,
wherein in response to the pairing, the host device is configured to generate an indication that the device is paired with the host device,
wherein the host device is configured to control the paired device,
wherein the device is configured to monitor operation of an elevator door, an escalator or an automatic door and to generate measurement data,
wherein the host device is configured to:
store the measurement data; and
perform predetermined operations based on the measurement data, and
wherein the request of the piece of information and the determination if the received piece of information comprises data corresponding to the expected data pattern is implemented with challenge-response authentication.

11. The system of claim 10, wherein the host device is configured to request the determination if the received piece of information comprises data corresponding to the expected data pattern from one of the following: the host device internally, the control device, the data center.

12. The system of claim 11, wherein the host device is configured to generate the request to the control device that generated the signal causing the host device to request a piece of information from the device.

13. The system of claim 10, wherein the control device is configured to identify a user of the control device through a user authentication prior to a communication causing the host device to request a piece of information from the device under deployment.

14. The system of claim 10, wherein the host device is further configured to generate control operations locally with respect to the device.

15. A computer program product comprising at least one non-transitory computer-readable storage medium having computer-executable program code instructions stored therein for performing the method of claim 1, when the computer program product is executed on the host device.

* * * * *